United States Patent [19]

Vroom et al.

[11] 4,015,586
[45] Apr. 5, 1977

[54] SOLAR WATER HEATER

[75] Inventors: Henry J. Vroom, Commack; Warren Robert Bolle, Old Bethpage; Herbert Schneider, Plainview; Burton Swerdling, Hauppauge, all of N.Y.

[73] Assignee: Grumman Aerospace Corporation, Bethpage, N.Y.

[22] Filed: Jan. 12, 1976

[21] Appl. No.: 648,258

[52] U.S. Cl. .................................. 126/271; 126/270; 52/86; 237/1 A
[51] Int. Cl.² .......................................... F24J 3/02
[58] Field of Search ........... 126/270, 271; 237/1 A; 165/48, 49; 52/80, 86; 34/242

[56] References Cited
UNITED STATES PATENTS

| | | | |
|---|---|---|---|
| 2,553,302 | 5/1951 | Cornwall | 126/271 |
| 2,918,023 | 12/1959 | Bettcher | 126/270 |
| 3,325,951 | 6/1967 | Johnson | 52/86 |
| 3,563,522 | 2/1971 | Blackman | 34/242 |
| 3,910,253 | 10/1975 | Thomason et al. | 126/271 |
| 3,949,732 | 4/1976 | Reines | 126/271 |

*Primary Examiner*—Kenneth W. Sprague
*Assistant Examiner*—James C. Yeung
*Attorney, Agent, or Firm*—Richard G. Geib; Mellor A. Gill

[57] ABSTRACT

A closed water/glycol solar heating system for preheating a fluid so as to reduce energy requirements in bringing said fluid up to a desired temperature and holding same, said system including a solar collector having a flexible dome.

3 Claims, 6 Drawing Figures

SOLAR WATER HEATER

FIELD OF INVENTION

This invention relates to a controllable system adapted to control the temperature of a fluid being used domestically or industrially such as the control of delivery of preheated water to a hot water tank.

BACKGROUND

There has been noted many prior attempts to utilize solar energy to effectuate a savings in energy requirements needed to heat buildings and/or make hot water for use therein. In attempting to do this many of these prior art attempts have sought to raise the temperature of water by direct exposure or commingling of the water with a solar radiation means.

Fewer attempts have been noted where efforts to avail of a separate fluid in heat exchange relationship with the water have been disclosed. To make a long story as breif as possible there appears singularly lacking in the art of a two fluid system having control means to regulate heat exchange from one closed circuit circulating fluid to another. It is in addressing this void in the art that this invention finds particularly significant utility in that it permits a solar energy system to be used in hot and freezing climates.

It is a significantly greater object of this invention to disclose to the practitioners in the art of solar energy heating means a standardized system which is far more economical, reliable, and functional than any other system known, to say nothing of the still further object of providing such a system that may be used to retrofit systems such as home hot water systems without the expense of major overhaul and equipment removal and replacement.

In greater detail it is an object of this invention to provide a system as aforesaid which adds to a structure a solar collector means of novel design for heating a storage tank connected between a water inlet and a hot water tank by means of a controllable system of circulating a water/glycol fluid therebetween.

Other objects and advantages will appear to those skilled in the art from an understanding of the drawings and the description thereof that follows.

DRAWING DESCRIPTION

DETAILED DESCRIPTION

Figure 1:
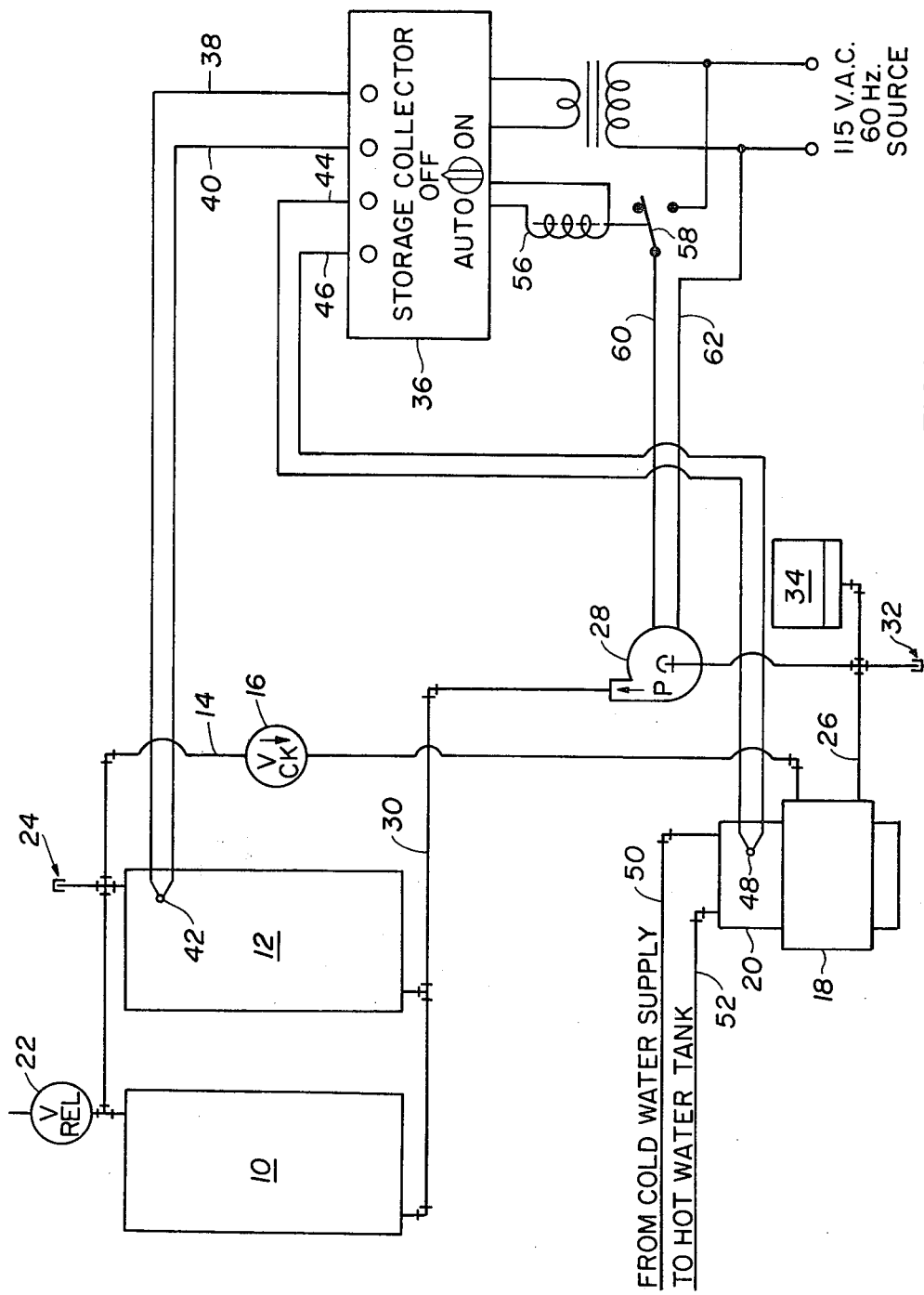
FIG. 1 is a block diagram of a solar heating system for hot water supply in a structure in accordance with this invention.

With more particular reference to FIG. 1 there is shown a closed water/glycol system having two solar collectors 10 and 12 connected in parallel for supplying solar heated fluid via line 14 having check valve 16 to a heat exchanger 18 about (it could be within but there is less chance of fluid commingling as shown) a glass lined storage tank 20. As shown the line 14 is equipped with a relief valve 22 and a fill port 24 to permit addition of the water/glycol fluid in the system.

From the heat exchanger 18, actually a thin walled tube-like structure having a substantial contact area with the liner of tank 20 to effectuate efficient heat exchange, a line 26 connects to a pump 28 that is connected by line 30 to collectors 10 and 12. Line 26 as can be readily seen is tapped first to provide a drain port 32 and secondly to connect in the closed circuit an expansion tank 34.

Completing a general description of the elements of the system is the temperature control 36 connected by leads 38 and 40 to a temperature sensor 42 in the solar collector system and leads 44 and 46 to a temperature sensor 48 in the storage tank for monitoring the difference in temperature between the water in the storage tank and the fluid in the solar collector. Cold water inlet of preheating storage is connected to supply pipe 50 and the heated water outlet pipe 52 from tank leads to the normal hot water heater. The sensors are known to the art connected in an appropriate circuit to control operation of the pump 28 whenever the temperature difference is such that circulation of the fluid will heat the water in the tank. Thus, a relay operated switch 58, connected between the power source and pump 28, will energize or de-energize pump 28 as required. In a system that has been constructed the relay 56 closes switch 58 whenever a temperature difference of 20° F or greater exists between sensors 42 and 48 and opens switch 58 as soon as that difference drop below 3° F. However, it is readily recognizable that those temperature limits could vary as required.

Figure 2:
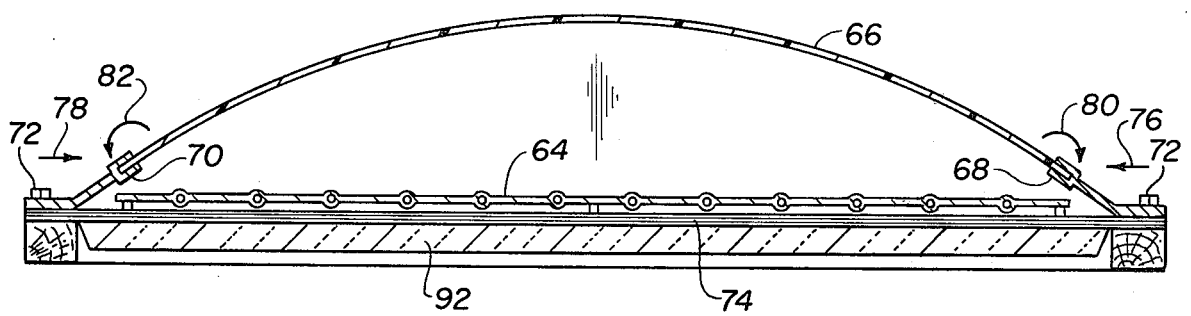
FIG. 2 is a view of a cross-section of the middle portion of the solar collector sans end frames.

With reference now to FIG. 2, the solar collectors have aluminum collector plates 64 under an acrylic dome 66. Transparent dome configurations for flat plate solar collectors have thus far generally been permanently shaped. As such they have involved expensive heat molding. With this invention, however, it has been found that one can avoid these costly heat forming methods. This is done by bending or springing the film, sheet or plate transparent material in the cold state directly into an arched shape and then mechanically restraining such developed shape.

This leads to the accomplishment of a still further advantage concerning portability during shipping. In addition such a structure will permit more easy removal and replacement of a damaged transparent dome without disconnecting any of the plumbing for the collector plate 64.

Actually edge extrusions 68 and 70 which extend the length of the dome are mechanically fastened by bolts 72 to a base plate 74 to provide forces in the directions of arrows 76 and 78 and moments 80 and 82 for given values of the width between the edge restraints 68 and 70 and perimeter length therebetween to produce the desired shape of the dome.

The aforesaid domed collector is placed within end frames 84 and 86 that are fastened to the base plate 74 to provide end closures for the collector housing that is sealed by hollow elastomeric gaskets 88 and 90.

Thermal installation requirements for the collectors 10 and 12 are provided by the sealed air gap above plate 64 and below it, the material/thickness selected for base plate 74 and the material/thickness selected for an insulating blanket 92. The inlet/outlet provisions 94 for liquid collectors are provided by appropriate holes or slots cut in the end frames 84 and 86 to allow passage of the associated plumbing. Finally while it has been mentioned that dome 66 is acrylic it will be readily understood that the plastic/elastomeric materials can be used that are defined as transparent outdoor weather resistant grades.

Figure 3:
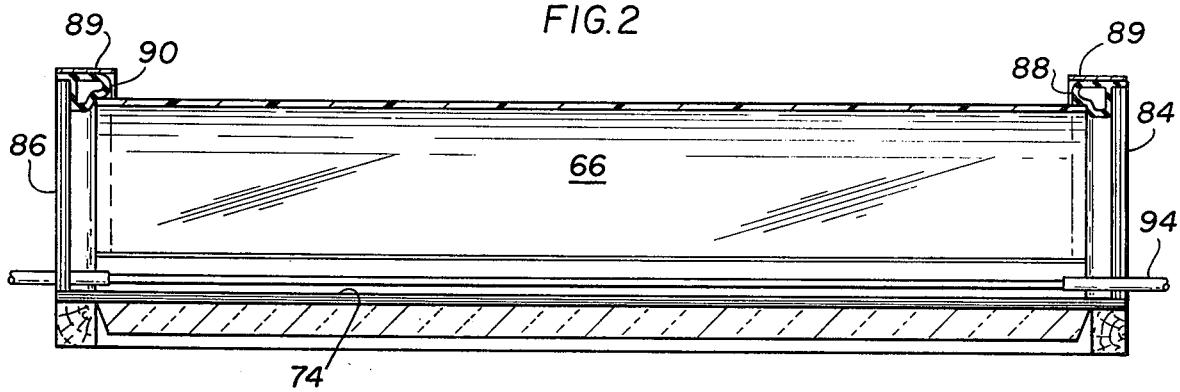
FIG. 3 is a side view in cross-section of a solar collector construction in accordance with this invention.
Figure 3A:
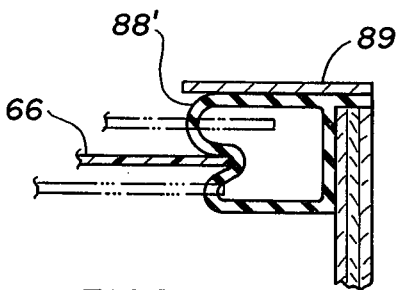
FIG. 3A & 3B are partial cross-sectional views of the end seal employed with the dome of the solar collector to allow expansion and constraction.
Figure 3B:
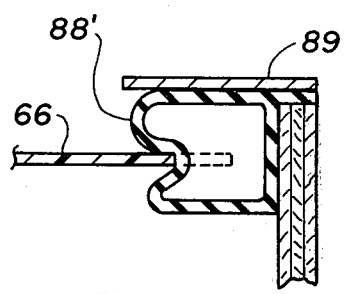

FIGS. 3A and 3B show the thermal expansion principles of the restrained transparent dome 66. The neutral position shown by solid lines is defined as that material state existing at cold forming of the dome and installation with the edge restraints 68 and 70. As the solar collector temperature increases the arched shape changes between the edge restraints and the length changes. The flexure of restraints 68 and 70 allow the former and the hollow gaskets 88 and 90 the latter. Actually FIG. 3A depicts a hollow elastomeric gasket 88' at the center of the dome closure serving as a compression seal. Increased and decreased temperature positions are depicted by the dash line attitudes above and below, respectively the neutral position shown. FIG. 3B shows the same compression seal 88' simulating a wiper type seal as it approaches the edge constraints 68, 70. The end frame cap strip 89 fastens the hollow elastomeric gasket in place and constrains the gasket and end frame 84 to perform as depicted. In other words caps 89 stabilize the seals 88 and 90 and integrate end frames 84 and 86 with the seals to the dome 66 to increase the structural integrity of the housing.

The collector plate 64 is coated with a solar absorbing materials which maximizes absorption and retention of the incident solar energy. As may be familiar to those skilled in the art the upper surface of plate 64 may be blackened or coated with a selective surface. In one embodiment the effective absorbing surface area of each collector was 25.4 square feet. The base is of exterior type plywood and the edge restraints aluminum extrusions. Insulating blanket 92 was adequate when fabricated from 1 inch thick fiberglass insulation with a vinyl vapor barrier on one side. In this construction the end frames were also of exterior type plywood. The use of a wood construction aids in insulation and ease of assembly and disassembly and repairing.

Further construction details thus far known has the storage tank 20 being an 82 gallon glass lined steel tank. The tank preferred is equipped with a magnesium anodic rod which is attached to the tope of the tank 20 and extends therewithin. Appropriate bosses are provided to connect lines 50 and 52 and, if necessary a pressure relief, and temperature sensor connection.

A rolled aluminum jacket heat exchanger 18 is attached to the outer circumference of storage tank 20. Prior to this installation a layer of suitable thermal grease is applied to the outer circumference of the tank. The grease increases the thermal conductance between the heat exchanger and the storage tank. Preferably the conductance is on the order of 20 BTU/hr/sq. ft./° F. After completing the plumbing connections insulation is wrapped about the tank and heat exchanger.

In order to accommodate the expansion of the solar collector working fluid, a pressurized diaphragm expansion tank 34 is installed in the system. This tank has means such as a diaphragm stretching across the inside diameter of the tank to separate it into chambers, one of which it is preferred to pressurize with air. This enables minimizing the size of an expansion tank.

Finally check valve 16 has a very important function in the system by eliminating thermosyphoning which could occur whenever solar collectors 10 and 12 are colder than tank 20: i.e. gravitational flow to a higher point caused by the difference of fluid densities, the latter being due to a temperature difference. Such may be normal at night without check valve 16.

OPERATION

Figure 4:
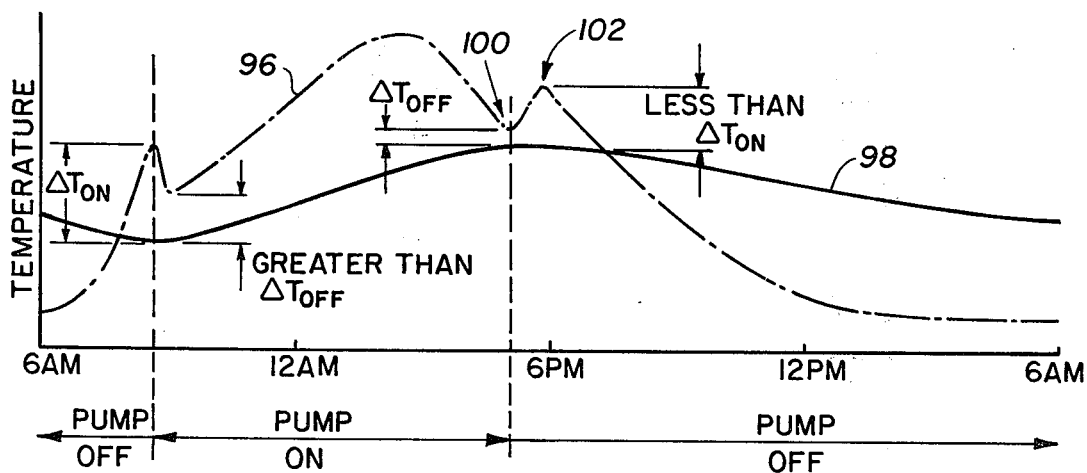
FIG. 4 is a graphical illustration of a typical 24 hour day operating cycle.

In operation with particular reference to FIG. 4 the pump is initially off. As the sun rises the collector temperature 96 rises sharply above the tank temperature 98. This is shown as $\Delta T_{on}$. Pump 28 is then turned on and the cooler water of tank 20 carries off the heat in the water/glycol from collector 10 and 12 and causes the drop of collector temperature but not enough to turn pump 28 off.

As evening approaches, the collector temperature moves below the $\Delta T_{off}$ threshold at point 100, and pump 28 is turned off. In that the sun is still heating the collectors and pump 28 is off the temperature trace 96 rises to a peak 102 which will be below that necessary to turn on the pump before dropping off as the sun sets. This enables a steadier tank temperature through the night.

Having described an operative construction for the invention it is now desired to set forth the intended protection sought by these Letters Patent in the appended claims that follows.

We claim:

1. A heating system for utilizing solar energy to raise the temperature of a fluid that is in turn circulated by controllable means to raise the temperature of a separate fluid, said system comprising:

solar collector means including a housing having a base insulated by glass fiber blanket on one side covered by a vinyl vapor barrier, a flat collector plate supported above the base on the other side thereof, channel dome edge restraints spaced a predetermined distance apart on each side of said base, end frames between the dome edge restraints at each end, elastomeric seals in the form of rubber extrusions mounted in a contour on a portion of the end frames above said base, cap means to stabilize and affix the seals in proper orientation on the end frames, and a flat transparent closure bowed by having its sides in the channel dome edge restraints spaced apart a width less than the closure and its ends abutting the seals under the cap means on the end frames to provide an accurate dome over the base that will with the base, edge restraints and seals on said end frames seal the collector plate environment above the base which is insulated and protected from any surface thereunder by the insulating blanket and vapor barrier between the base and surface;

a heat exchanger connected to receive a fluid from said collector plate and return same;

storage tank means for a fluid to be heated, said storage tank means having its exterior walls in heat transfer relationship with said heat exchanger and fluid inlet and outlet means for a fluid to be heated by heat transferred to the walls of said storage tank means;

pump means in the return from heat exchanger to collector plate for circulating a fluid between said heat exchanger and said solar collector means;

flow directing valve means to prevent return flow from heat exchanger to collector plate in the means connected to permit the heat exchanger to receive fluid from said collector plate;

a pressurized expansion tank in the return from the heat exchanger to said solar collector means for fluid expansion and replenishment within a closed circuit of collector plate and heat exchanger; and a differential temperature controller including temperature sensors in the solar collector means for obtaining temperature of fluid in the collector plate and in the storage tank means for obtaining temperature of fluid therein and relay means responsive to the sensors for a switch to control operation of said pump means and thereby the circulation of fluid used to raise the temperature of the fluid inside the walls of said storage tank means by heating said walls from said heat exchanger.

2. A system according to claim 1 and further comprising two solar collector means in parallel in the closed circuit each with a collector plate to provide added heat generating means and fail safe reliability.

3. In a heating system having a solar collector for heating a storage means, an improved solar collector construction comprising:

a collector plate that is coated with a solar absorbing material which maximizes absorption and retention of incident solar energy; and a housing construction to support said collector plate such that there is an air gap to thermally insulate said collector plate from the housing, said housing including, a base on one side of which is an insulating blanket enclosed by a vapor barrier and on the other side of which is said collector plate spaced therefrom, a pair of edge restraints, one on one side of the base and the other on the opposite side of the base both extending for the length of the respective side and each terminating in a channel facing each other at an angle whose apex is above said base the channel of the one and the channel of the other being spaced a predetermined distance apart, two end frames, one for each end of the base, said end frames having a hollow elastomeric seal means along a predetermined path on each end frame stabilized by cap strip means thereover, and a transparent flat, flexible sheet having a greater width than the predetermined distance apart of the spaced channel of the one and channel of the other edge restraint, said sheet having its edges in said channel of the one and channel of the other and its ends abutting the seal means of each end frame so as to be constrained and formed by the end frames and edge restraints into a dome to seal the environment about the collector plates.

* * * * *